March 7, 1944.   G. WHEATLEY   2,343,724
METHOD OF RETREADING TIRES
Original Filed Jan. 6, 1937
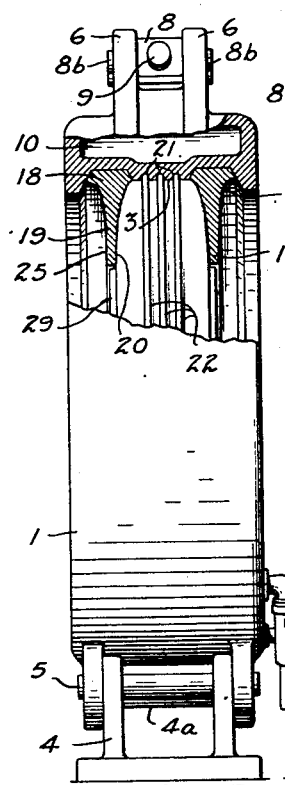
Fig. 2
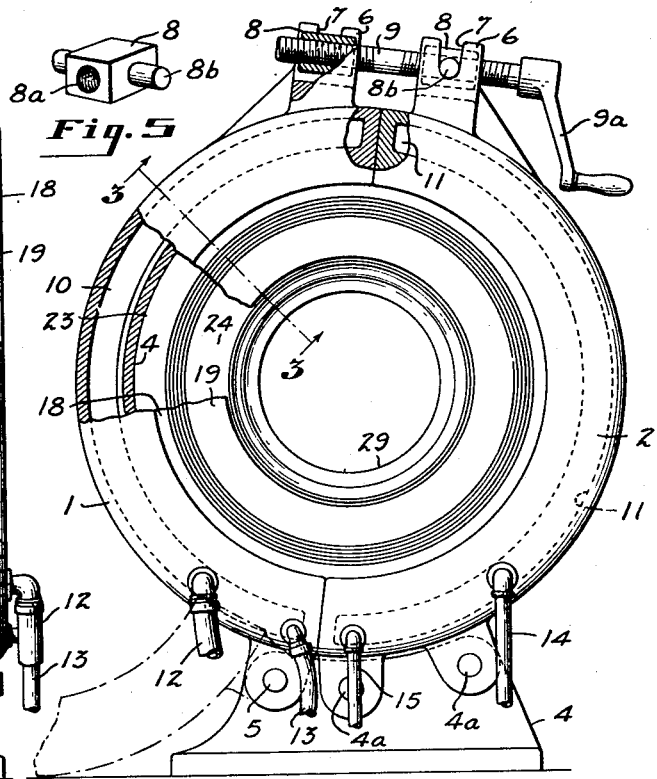
Fig. 5
Fig. 1
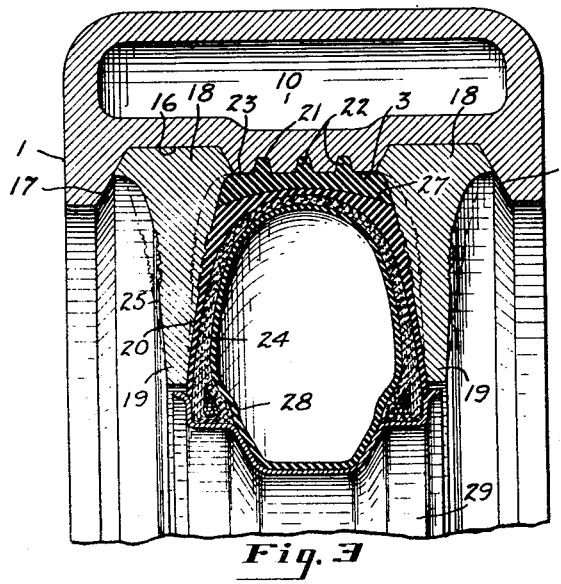
Fig. 3
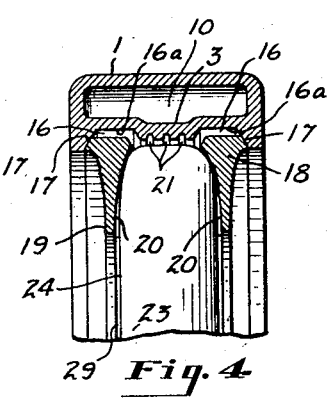
Fig. 4
INVENTOR
George Wheatley
BY Evans & McCoy
ATTORNEYS Patented Mar. 7, 1944

2,343,724

UNITED STATES PATENT OFFICE 2,343,724

METHOD OF RETREADING TIRES

George Wheatley, Imlay City, Mich., assignor to The General Tire & Rubber Company, Akron, Ohio, a corporation of Ohio Original application January 6, 1937, Serial No. 119,286. Divided and this application February 2, 1940, Serial No. 316,955

6 Claims. (Cl. 154—14)

This invention relates to an improved method of vulcanizing and retreading vehicle tires, and is a division of my copending patent application, Serial No. 119,286, filed January 6, 1937, now matured into Patent No. 2,313,414, dated March 9, 1943.

One of the objects of the present invention is to provide an improved tire retreading method which is simple and economical, and which is easy to carry out.

Another object is to provide a tire retreading method which is efficient, and which produces a superior product.

Another object is to provide a tire retreading and vulcanizing method which can be used in retreading tires of different tread width.

A further object is to provide a tire retreading and vulcanizing method which eliminates side wall flash in the retreaded tire.

With the above and other objects in view, which will become apparent as the description proceeds, the present invention consists of certain process steps and features of arrangements and combinations of parts to be hereinafter described with reference to the accompanying drawing and then claimed.

In the drawing, which illustrates a suitable embodiment of apparatus for carrying out the invention, Figure 1 is a side elevation of vulcanizing apparatus, a portion of the same being in section;

Fig. 2 is an end elevation of the vulcanizing apparatus shown in Figure 1;

Fig. 3 is an enlarged section taken approximately on line 3—3 of Figure 1;

Fig. 4 is a section similar to Fig. 3 before the movable heater is completely clamped; and Fig. 5 is a perspective view of one of the clamping blocks.

Referring to the accompanying drawing in which like numerals refer to like parts throughout the several views, the vulcanizing apparatus illustrated, and which may be used to carry out the method of the present invention, includes a pair of arcuate parts 1 and 2, each having a semicircular radially inwardly facing face 3 for engaging the tire tread, which when the parts are in closed position as indicated in Fig. 1 form a continuous cylindrical tread engaging surface.

One end of the part 2 is mounted on a suitable base 4 by means of pins 4a and the part 1 is hingedly connected at one end to the base 4 by a hinge pin 5, the parting line between the two parts being slightly inclined with respect to the vertical plane. The parts 1 and 2 are each provided at their upper ends with spaced clamping lugs 6 having aligned slots 7 therein. Arranged between each pair of lugs 6 is a screw block 8 having pins 8b extending from its opposite sides and seated in the slots 7. The blocks 8 are provided with oppositely threaded internal bores 8a, which receive the oppositely threaded ends of a clamping screw 9, which is provided with a handle or crank 9a. By rotating the screw 9, the part 1 may be drawn into contact with the part 2 or moved away therefrom. When the screw 9 is rotated in a direction to separate the parts 1 and 2, the screw 9 and blocks 8 may be lifted from the assembly to permit the part 1 to be swung to its open position.

The parts 1 and 2 are provided with heating chambers 10 and 11, respectively, for receiving a heating medium, the chamber 10 having an inlet conduit 12 and an outlet conduit 13 at its lowest region, and the chamber 11 having an inlet conduit 14 and an outlet conduit 15 at its lowest region.

Arranged at each side of the tread engaging portion or face 3 of each of the parts 1 and 2 is a parallel groove 16 having a flat bottom 16a and divergent side faces 17. These grooves 16 of the one part register with the corresponding grooves of the other part and form continuous circumferential channels when the parts 1 and 2 are clamped together to receive and locate spaced side wall engaging rings 18. The rings 18 are peripherally shaped to snugly fit within the grooves 16 when parts 1 and 2 are clamped together. The rings 18 are each of one piece construction and provided with a radially inwardly extending flange 19, the inner face 20 of which is shaped to engage with the tire side wall and to form a continuation of the tread engaging face 3, as shown in Fig. 3.

The tread engaging face 3 may be recessed to provide a suitable tread pattern, and as here shown, is formed with circumferential grooves 21 to form ribs 22 in the tread portion 23 to be vulcanized to the tire casing 24.

Each of the rings 18 is reversible and the outer faces 25 are formed to different shape than their inner faces 20, so that when the rings 18 are reversed as indicated by the broken outline 26 in Fig. 3, the faces 25 then facing each other, the vulcanizer will accommodate a tire casing having a greater width adjacent the tread.

Also, the rings 18 may be replaced by other rings having side faces of different contours.

In the conventional retreading vulcanizers, it is the practice to form the portions thereof which engage with the tire casing side walls to a circular shape corresponding substantially to the curvature of the tire casing side walls.

In the construction of the molding apparatus for carrying out the method of the present invention, the side wall engaging faces 20 or 25, as the case may be, of the rings 18 are provided with a slight curvature and are practically straight, and diverge radially inwardly from the tread engaging face 3 so that the tire casing when confined within the vulcanizer has a wedge-like appearance.

According to the method of the present invention, the tire casing is prepared for retreading by removing as much of the old tread as is necessary to present an even surface 27. A suitable air bag 28 is positioned within the casing 24, and the casing is mounted on a suitable retaining rim 29.

The vulcanizer is opened and the mounted tire casing 24 with the new tread 23 in position is disposed against the tread engaging face 3 of the lower part 2, and the side rings 18 are dropped into position at each side of the tire casing and into the grooves 16 of the stationary part 2.

The movable part 1 is then swung to its closed position and clamped by positioning the screw 9 and blocks 8 and rotating the screw 9, the upper portions of the rings 18 being received in the grooves 16. During the closing of the mold, the heater circumferentially contracts and the divergent or tapering side faces 17 of the grooves 16 progressively draw the rings 18 toward one another. The movements of the annular heater parts and the spaced side wall engaging rings are thus synchronized so that the rings are brought to their final positions just as the heater is closed. The air bag 28 is then inflated. Because of the fact that the flanges 19 of the rings 18 are of such a radial depth that their inner peripheries are disposed closely adjacent the flanges of tire supporting rim 29, and because of the converging curved contour of the side faces of the rings 18, inflation of the air bag causes the tread 23 and adjacent portions of the tire casing to become substantially wedged between the inner faces of the rings 18, causing the tread 23 and the casing 24 to have a complete and intimate contact which insures proper vulcanization of the tread to the casing. The casing of the tire with the new tread rubber applied thereto is supported over substantially the entire area of the tread and uninterruptedly from the tread over the side walls. A deformation of the casing, which decreases the width of the peripheral tread portion, occurs during the closing of the mold, and the tire is vulcanized while the casing is thus held or embraced in deformed shape with a narrowed outwardly facing tread.

A heating medium is then allowed to enter the chambers 10 and 11 through the inlet conduits 12 and 14 to heat the tread engaging faces to the proper vulcanizing temperature. The vulcanization occurs while the tire is deformed, and the side walls diverge from one another radially inwardly from the tread to the beads, thus imparting a wedgelike appearance to the casing in cross section.

After the vulcanizing operation, the retreaded tire casing is easily removed by rotating the screw 9 to release the clamping pressure and by swinging the movable part 1 to its open position, after which the rings 18 and tire casing are lifted from the lower part.

Since the rings 18 are of one piece construction, no objectionable flash will appear at the side walls of the tire casing. Also, if a wider tread face is desired, the positions of the rings 18 may be reversed. Furthermore, if other side wall contours are desired, the rings 18 may be replaced by other rings having the desired side face shape.

Obviously, therefore, the same vulcanizing parts may be utilized for retreading tires of the same diameter having different tread widths.

The vulcanizing apparatus is simple in construction and is easily and simple to operate.

Although but a single embodiment of apparatus for performing the method of the invention has been herein shown and described, it will be understood that numerous details of the construction shown may be altered or omitted and the steps of the process may be modified without departing from the spirit of this invention as defined in the following claims.

What I claim is:

1. The method of vulcanizing a pneumatic tire casing having spaced side walls and a tread extending between the outer peripheries of the side walls, which comprises moving the outer peripheries of the side walls toward one another to deform the casing and decrease the width of the tread, supporting the deformed casing over substantially the entire area of the narrowed tread and uninterruptedly from the tread over the side walls, applying pressure internally of the casing, and heating the tread while the casing is deformed.

2. The method of vulcanizing a pneumatic tire casing having a road engaging tread portion and spaced side walls, which comprises deforming the casing to decrease the width of the tread portion so that the casing is wedgelike in cross section with the side walls diverging radially inwardly from the tread to the beads, and heating the entire surface of the tread while the casing is so deformed.

3. The method of retreading a pneumatic tire casing which comprises applying fresh rubber to the tread portion of the tire between the shoulders thereof, deforming the casing in such manner as to increase the normal curvature across the width of the tread and thereby move the shoulders together and decrease the tread width, and applying heat to the fresh rubber while the casing is so deformed.

4. The method of retreading a pneumatic tire casing which comprises applying fresh rubber to the tread portion of the tire between the shoulders thereof, circumferentially embracing the tire casing about the periphery thereof and progressively contracting the same circumferentially to compress the applied rubber, simultaneously and concurrently with said contracting applying lateral pressure to the side walls of the casing to move the side walls together and thereby decrease the tread width of the tire, and heating the applied rubber.

5. The method of operating a tire mold having a circular heater for embracing the tread portion of a tire and separate rings for engaging the side walls of a tire which comprises progressively contracting the heater circumferentially about the tire periphery to embrace and progressively compact the tread rubber of the tire, moving the rings toward one another concurrently with the contracting of the heater to progressively narrow the tread portion of the tire while the tread rubber is compacted and until the rings are brought into circumferential engagement with the heater at the tire surface adjacent the shoulders of the tire whereby the narrowed and compacted tire is confined by the heater and the rings by continuous contact extending across the tread portion and down the side walls and around the entire circumference of the tire, applying heat directly to the heater, and heating the rings solely by conduction through their outer peripheries engaged by the heater.

6. In the process of renewing a pneumatic tire in a full circle mold having a tread heater and shoulder curing rings, the improvement which comprises applying a band of new rubber about the periphery of the tire, thereby providing circumferentially extending lines of connection between the old rubber and the new rubber along the shoulders of the tire, placing the tire with the applied band in the mold in such position that the rings overlie said lines of connection and the heater contacts only the new rubber of the tire, applying heat directly to the heater to cure the new rubber, and heating the rings solely by conduction from the heater whereby the most intense heat is applied to the tire by the heater and a lesser degree of heat is applied to the tire by each of the rings along the lines of connection.

GEORGE WHEATLEY.